(12) United States Patent
Shah

(10) Patent No.: US 12,579,499 B1
(45) Date of Patent: Mar. 17, 2026

(54) PREDICTING WHETHER TEMPERATURE-SENSITIVE ITEMS WILL TRANSITION OUTSIDE OF A TARGET TEMPERATURE RANGE DURING TRANSPORT USING A MACHINE LEARNING MODEL

(71) Applicant: Maplebear Inc., San Francisco, CA (US)

(72) Inventor: Naval Shah, Toronto (CA)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/961,123

(22) Filed: Nov. 26, 2024

(51) Int. Cl.
*G06Q 10/0832* (2023.01)

(52) U.S. Cl.
CPC ................................. *G06Q 10/0832* (2013.01)

(58) Field of Classification Search
CPC .................................................. G06Q 10/0832
USPC ........................................................... 705/332
See application file for complete search history.

(56) References Cited

U.S. PATENT DOCUMENTS

| | | | |
|---|---|---|---|
| 9,230,233 B1 * | 1/2016 | Sundaresan ............ | G06Q 50/40 |
| 2021/0150467 A1 * | 5/2021 | Sakai .................... | F25D 29/003 |
| 2022/0110189 A1 * | 4/2022 | Volkerink .......... | G06Q 10/0832 |
| 2024/0346432 A1 * | 10/2024 | Justis ................... | G06Q 30/016 |
| 2025/0139574 A1 * | 5/2025 | Li .......................... | G06N 3/084 |

FOREIGN PATENT DOCUMENTS

| | | | | |
|---|---|---|---|---|
| CN | 118097316 A | * | 5/2024 | ............. G06V 20/52 |
| JP | 2017182240 A | * | 10/2017 | |
| WO | WO-2023106628 A1 | * | 6/2023 | ............. G05D 1/648 |
| WO | WO-2024161226 A1 | * | 8/2024 | ........... G06Q 10/083 |

OTHER PUBLICATIONS

Chopra, Ankush. "Delivery Issues Identification from Customer Feedback Data," Dec. 26, 2021, MLDS 2022. https://arxiv.org/abs/ 2112.13372. pp. 1-7. (Year: 2021).*
A. Alamsyah, M. N. Z. Jannah and D. P. Ramadhani, "Uncovering Customer Issues in E-Commerce: Sentiment Analysis and Topic Modeling Approach," 2023 6th International Conference on Information and Communications Technology (ICOIACT), Yogyakarta, Indonesia, 2023, pp. 355-360. (Year: 2023).*

* cited by examiner

*Primary Examiner* — Jeff Zimmerman
*Assistant Examiner* — Hunter Molnar
(74) *Attorney, Agent, or Firm* — Fenwick & West LLP

(57) ABSTRACT

An online system generates a request to transport a set of items from a source location to a destination location. The set of items includes at least one temperature-sensitive item. The system extracts a set of input features about the request to transport the set of items. The set of input features includes an estimated transportation time for transporting the set of items from the source location to the destination location. The system applies a machine learning model to the set of input features to output a score for the temperature-sensitive item, indicating a likelihood that the temperature-sensitive item will transition outside of a target temperature range before completing the transportation. Responsive to the method outputting the score above a threshold, the system adjusts the request and outputs the adjusted request to one or more computing systems, causing the one or more computing systems to display the adjusted request.

20 Claims, 4 Drawing Sheets

400

PREDICTING WHETHER TEMPERATURE-SENSITIVE ITEMS WILL TRANSITION OUTSIDE OF A TARGET TEMPERATURE RANGE DURING TRANSPORT USING A MACHINE LEARNING MODEL

BACKGROUND

Users of an online concierge system may purchase various temperature-sensitive food and grocery products. These items range from those that require low-temperature storage, such as ice cream, popsicles, and frozen chicken typically found in the frozen section of a grocery store, to those that must be kept at elevated temperatures, like freshly prepared rotisserie chickens or hot soups located in the store's prepared foods area. Additionally, certain products like chocolate bars, which are generally stored at room temperature, are prone to melting and quality degradation if exposed to heat. Consequently, the list of temperature-sensitive items that need careful handling is quite comprehensive.

If a user finds that any temperature-sensitive items in their order were irreparably harmed due to prolonged exposure to inappropriate temperatures, they are likely to seek an appeasement, such as a refund. This dissatisfaction may also prompt users to give a negative rating to the individual responsible for selecting or delivering the items or to the entire order, pointing out issues such as inadequate insulation or insufficient temperature management during handling or transit. Furthermore, as a direct result of their disappointment with the handling of these temperature-sensitive items, users might also consider decreasing tips given to the pickers.

A technical problem arises in maintaining the integrity of temperature-sensitive items throughout their handling and transportation process and predicting temperature excursions during such handling and transportation. The varying nature of these items, from frozen desserts to hot prepared meals, cause them to have different temperature sensitivities. The problem is further compounded by other contextual variables associated with different transportation environments and the logistics of transitioning items from controlled environments, such as storage facilities, to less controlled environments, such as delivery vehicles, and ultimately to the end destination.

SUMMARY

Figure 1:
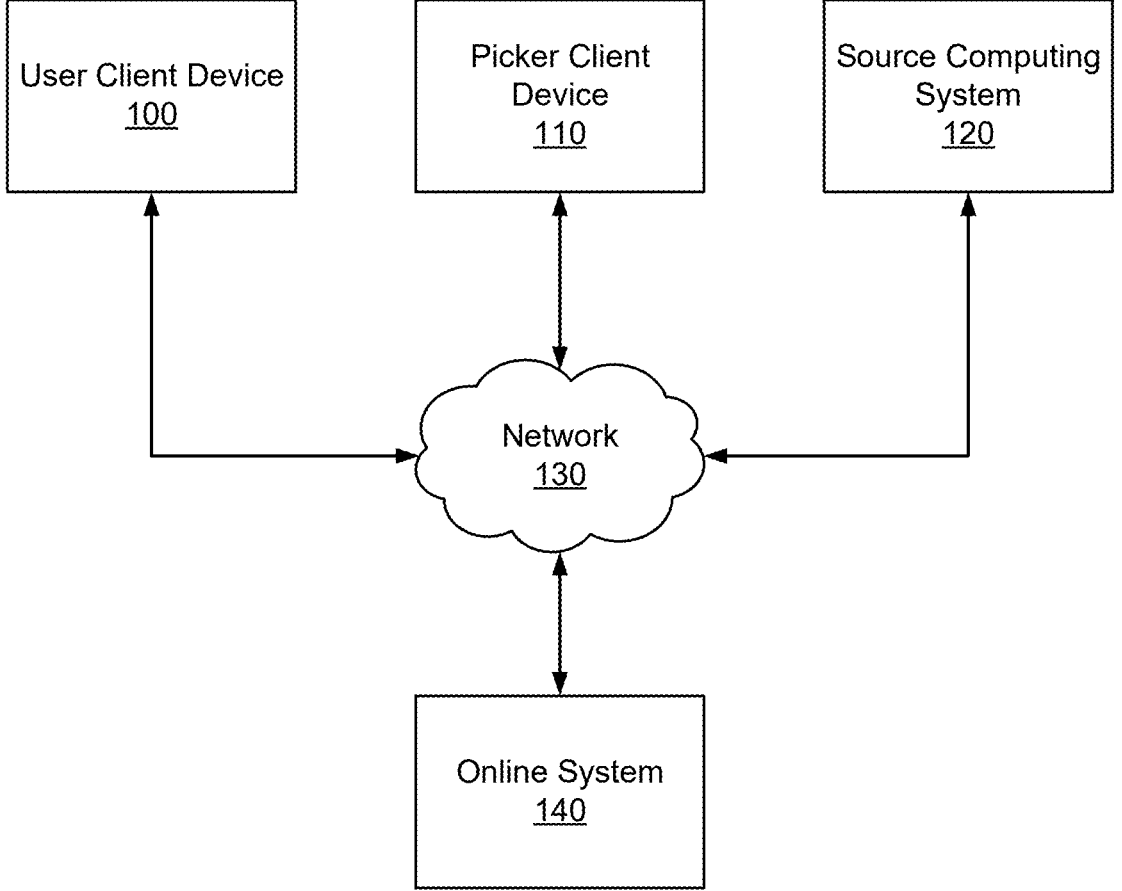
FIG. 1 illustrates an example system environment for an online system, in accordance with one or more embodiments.

To address the technical problem of predicting and managing temperature deviations for sensitive items during transit, embodiments described herein include a system or a method using a machine learning model. The system generates a request to transport a set of items from a source location to a destination location. The set of items includes at least one temperature-sensitive item The system extracts a set of input features about the request to transport the set of items. The set of input features includes, but is not limited to, an estimated transportation time for completing the request for the order. A machine learning model is applied to the set of input features to determine a score for the temperature-sensitive item. The score indicates a likelihood that the temperature-sensitive item will fall outside of an acceptable temperature range before completing the transporting of the set of items from the source location to the destination location. Responsive to the model outputting a score above a threshold, the online system adjusts the request to transport the set of items from the source location to the destination location, and outputs the adjusted request to transport the set of items to one or more computing systems, causing the one or more computing systems to display the adjusted request to transport the set of items.

DETAILED DESCRIPTION

Users of an online concierge system may purchase various temperature-sensitive food and grocery products. These items range from those that require low-temperature storage, such as ice cream, popsicles, and frozen chicken typically found in the frozen section of a grocery store, to those that must be kept at elevated temperatures, like freshly prepared rotisserie chickens or hot soups located in the store's prepared foods area. Additionally, certain products like chocolate bars, which are generally stored at room temperature, are prone to melting and quality degradation if exposed to heat. Consequently, the list of temperature-sensitive items that need careful handling is quite comprehensive.

If a user finds that any temperature-sensitive items in their order were irreparably harmed due to prolonged exposure to inappropriate temperatures, they are likely to seek appeasement, such as a refund. This dissatisfaction may also prompt users to give a negative rating to the individual responsible for selecting or delivering the items (the picker) or to the entire order, pointing out issues such as inadequate insulation or insufficient temperature management during handling or transit. Furthermore, as a direct result of their disappointment with the handling of these temperature-sensitive items, users might also consider decreasing tips given to the pickers.

A technical problem arises in maintaining the integrity of temperature-sensitive items throughout their handling and delivery process. Predicting temperature excursions during transportation involves complex variables, including transit duration, handling time at various points, and external environmental conditions.

To address the technical problem of predicting and managing temperature deviations for sensitive items during transit, embodiments described herein include a system or a method using a machine learning model to output a score for each item in a batch (including this order and one or more other orders). This score indicates a likelihood of damage due to inappropriate temperature conditions. Based on this score, the online concierge system can use one or more machine learning models to make predictions and/or make decisions on how to manage the order. If the risk associated with a batch—which includes this order and one or more other orders—is deemed too high, the online concierge system can either exclude the current order from the batch or reorganize the batch. This reorganization might involve re-batching orders or altering the delivery sequence to reduce risk. Additionally, the system may separate the picking and packing processes from the delivery, assigning the latter to a different shopper who has a shorter delivery route, thereby minimizing the time items are exposed to potentially damaging conditions. Alternatively, the online concierge system might opt to issue specific instructions to the picker, such as using insulated bags, avoiding direct sunlight, and choosing where in the vehicle to store items, aimed at mitigating risk and preventing insulation-related issues.

The inputs of the machine learning model may include (but are not limited to) a sequence of drop-offs for the orders in the batch. For example, if there are three orders in the batch, and this order is the last one to be dropped off. That means the temperature-sensitive item in the order will be sitting in a vehicle longer than items in the other orders. In some embodiments, the inputs of the machine learning model may further include contextual information associated with the batch, such as (but not limited to) information about the weather during fulfillment time, time of day, and a geo-location or region of drop off locations.

In some embodiments, the model can be trained over historical data of user orders and fulfillment of the orders. The order data includes (but is not limited to) appeasements, user ratings, user tip reductions, etc. The fulfillment data includes (but is not limited to) a pick and pack time, a total driving time, and contextual information about weather, time-of-day, and drop-off locations.

In some embodiments, a large language model (LLM) may be used to answer questions about whether the appeasement request is related to insulation. Further, the online concierge system can also use user ratings related to insulation, or tip reductions to determine whether the appeasement request is related to insulation. For example, after a delivery if a user gives a thumbs up or thumbs down, but also chooses a category for an issue, e.g., insulation-related issue. In some cases, a food safety team may routinely perform temperature checks on items upon delivery. The result of the checking may also be included as additional training data in addition to the above user data or fulfillment data.

FIG. 1 illustrates an example system environment for an online system 140, in accordance with one or more embodiments. The system environment illustrated in FIG. 1 includes a user client device 100, a picker client device 110, a source computing system 120, a network 130, and an online system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and source computing system 120 are illustrated in FIG. 1, any number of users, pickers, and sources may interact with the online system 140. As such, there may be more than one user client device 100, picker client device 110, or source computing system 120.

The user client device 100 is a client device through which a user may interact with the picker client device 110, the source computing system 120, or the online system 140. The user client device 100 can be a personal or mobile computing device, such as a smartphone, a tablet, a laptop computer, or desktop computer. In some embodiments, the user client device 100 executes a client application that uses an application programming interface (API) to communicate with the online system 140.

A user uses the user client device 100 to place an order with the online system 140. An order specifies a set of items to be delivered to the user. An "item," as used herein, means a good or product that can be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more sources from which the ordered items should be collected.

The user client device 100 presents an ordering interface to the user. The ordering interface is a user interface that the user can use to place an order with the online system 140. The ordering interface may be part of a client application operating on the user client device 100. The ordering interface allows the user to search for items that are available through the online system 140 and the user can select which items to add to an "ordering list." A "ordering list," as used herein, is a tentative set of items that the user has selected for an order but that has not yet been finalized for an order. The ordering list may alternatively be referred to as a "cart" or "shopping cart." The ordering interface allows a user to update the ordering list, e.g., by changing the quantity of items, adding or removing items, or adding instructions for items that specify how the item should be collected.

The user client device 100 may receive additional content from the online system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the source computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a source. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same source location. The collection interface further presents instructions that the user may have included related to the collection of items in the order. Additionally, the collection interface may present a location of each item at the source, and may even specify a sequence in which the picker should collect the items for improved efficiency in collecting items. In some embodiments, the picker client device 110 transmits to the online system 140 or the user client device 100 which items the picker has collected in real time as the picker collects the items.

The picker can use the picker client device 110 to keep track of the items that the picker has collected to ensure that the picker collects all the items for an order. The picker client device 110 may include a barcode scanner that can decode an item identifier encoded in a machine-readable label (e.g., a barcode or a QR code) coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and identifies the item identifier for the item based on the images. The picker client device 110 may determine the item identifier directly or by transmitting the images to the online system 140. Furthermore, the picker client device 110 determines weights for items that are priced by weight. The picker client device 110 may prompt the picker to manually input the weight of an item or may communicate with a weighing system in the source location to receive the weight of an item.

When the picker has collected the items for an order, the picker client device 110 instructs a picker on where to deliver the items for a user's order. For example, the picker client device 110 displays a delivery location from the order to the picker. The picker client device 110 also provides navigation instructions for the picker to travel from the source location to the delivery location. When a picker is servicing more than one order, the picker client device 110 identifies which items should be delivered to which delivery location. The picker client device 110 may provide navigation instructions from the source location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the source location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In some embodiments, the picker is a single person who collects items for an order from a source location and delivers the order to the delivery location for the order. Alternatively, more than one person may serve the role of a picker for an order. For example, multiple people may collect the items at the source location for a single order. Similarly, the person who delivers an order to its delivery location may be different from the person or people who collected the items from the source location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a source location for an order and an autonomous vehicle may deliver an order to a user from a source location.

In one or more embodiments, the online system 140 communicates with a smart shopping cart being used by a user to collect items in a source location. For example, the smart shopping cart may display content received from the online system and may receive data describing items that are collected by the user and stored in a storage area of the shopping cart. In some embodiments, the smart shopping cart is a picker client device 110 being operated by a picker collecting items within a source location. Similarly, the smart shopping cart may be operated by a user within the source location collecting items for themselves. Example embodiments of smart shopping carts are described in U.S. patent application Ser. No. 18/630,672, entitled "Automated Identification of Items Placed in a Cart and Recommendations based on Same," filed Apr. 9, 2024, which is hereby incorporated by reference in its entirety.

The source computing system 120 is a computing system operated by a source that interacts with the online system 140. As used herein, a "source" is an entity that operates a "source location," which is a store, warehouse, or any other source from which a picker can collect items. The source computing system 120 stores and provides item data to the online system 140 and may regularly update the online system 140 with updated item data. For example, the source computing system 120 provides item data indicating which items are available at a particular source location and the quantities of those items. Additionally, the source computing system 120 may transmit updated item data to the online system 140 when an item is no longer available at the source location. Additionally, the source computing system 120 may provide the online system 140 with updated item prices, sales, or availabilities. Additionally, the source computing system 120 may receive payment information from the online system 140 for orders serviced by the online system 140. Alternatively, the source computing system 120 may provide payment to the online system 140 for some portion of the overall cost of a user's order (e.g., as a commission).

The user client device 100, the picker client device 110, the source computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of the standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which users can order items to be provided to them by a picker from a source. The online system 140 receives orders from a user client device 100 through the network 130. The online system 140 selects a picker to service the user's order and transmits the order to a picker client device 110 associated with the picker. If the picker accepts the order, the picker collects the ordered items from a source location and delivers the ordered items to the user. The online system 140 may charge a user for the order and provide portions of the payment from the user to the picker and the source.

As an example, the online system 140 may allow a user to order groceries from a grocery store source. The user's order may specify which groceries they want to be delivered from the grocery store and the quantities of each of the groceries. The user's client device 100 transmits the user's order to the online system 140 and the online system 140 selects a picker to travel to the grocery store source location to collect the groceries ordered by the user. The online system transmits an offer to the picker for the picker to service the order in exchange for consideration and, if the picker accepts the offer, the picker collects the groceries from the grocery store. Once the picker has collected the groceries ordered by the user, the picker delivers the groceries to a location transmitted to the picker client device 110 by the online system 140. The online system 140 is described in further detail below with regards to FIG. 2.

Figure 2:
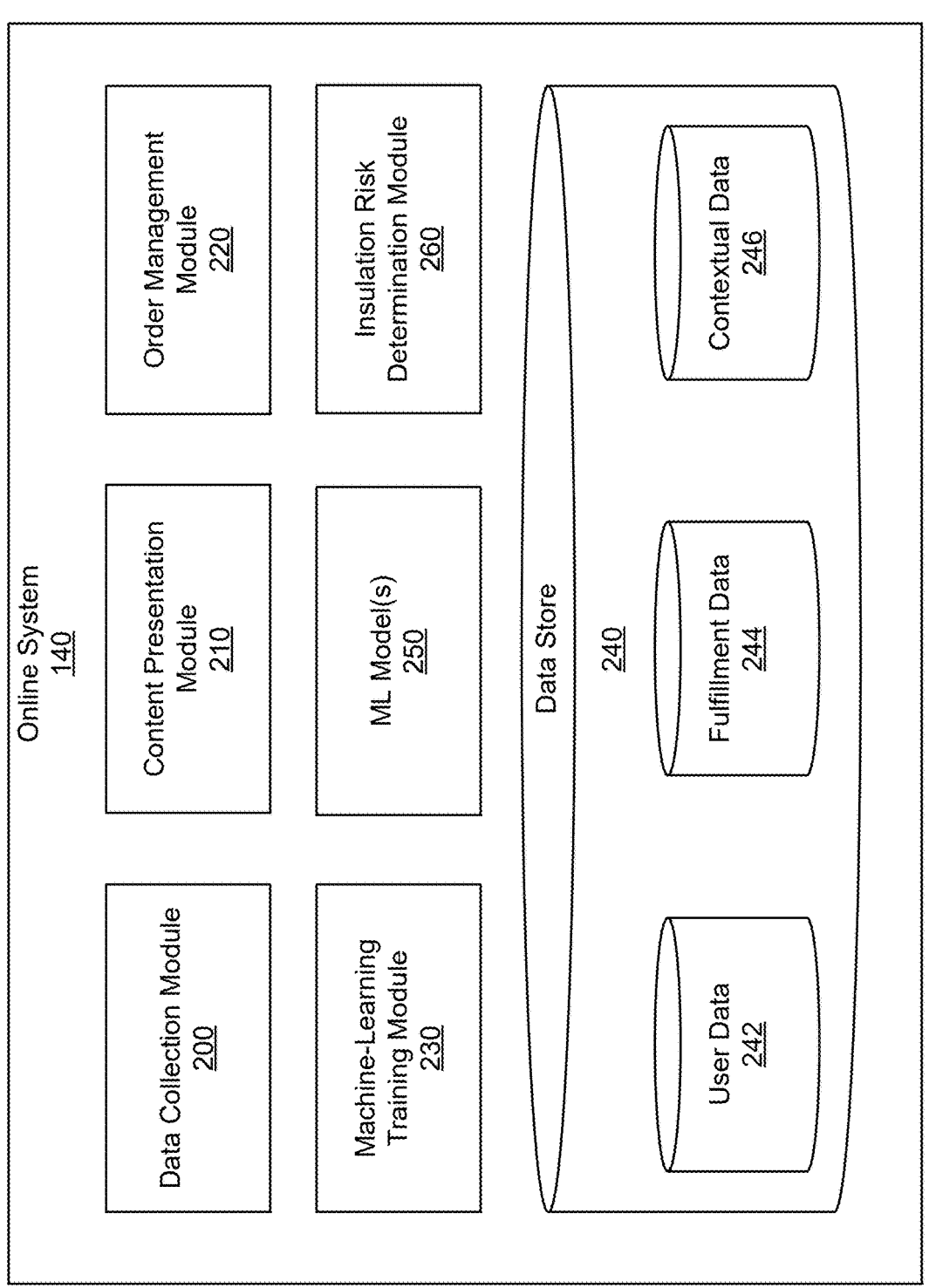
FIG. 2 illustrates an example system architecture for an online system, in accordance with one or more embodiments.

FIG. 2 illustrates an example system architecture for an online system 140, in accordance with some embodiments. The system architecture illustrated in FIG. 2 includes a data collection module 200, a content presentation module 210, an order management module 220, a machine-learning training module 230, one or more machine learning model(s) 250, an insulation risk determination module 260, and a data store 240. The data store 240 stores user data 242, fulfillment data 244, and contextual data 246, among others. User data 242 may include users' personal information, payment information, preferences and order history, delivery information, feedback on orders, etc. The fulfillment data may include order details, inventory levels, delivery scheduling, status updates, etc. The contextual data may include weather data, traffic data, etc. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. In preferred embodiments, the data collection module 200 only collects data describing a user if the user has previously explicitly consented to the online system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, shopping preferences, favorite items, or stored payment instruments. The user data also may include default settings established by the user, such as a default source/source location, payment instrument, delivery location, or delivery timeframe. The data collection module 200 may collect the user data from sensors on the user client device 100 or based on the user's interactions with the online system 140.

The data collection module 200 also collects item data, which is information or data that identifies and describes items that are available at a source location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in source locations. For example, for each item-source combination (a particular item at a particular warehouse), the item data may include a time that the item was last found, a time that the item was last not found (a picker looked for the item but could not find it), the rate at which the item is found, or the popularity of the item. The data collection module 200 may collect item data from a source computing system 120, a picker client device 110, or the user client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online system 140, a user rating for the picker, which sources the picker has collected items at, or the picker's previous shopping history. Additionally, the picker data may include preferences expressed by the picker, such as their preferred sources to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a user associated with the order, a source location from which the user wants the ordered items collected, or a timeframe within which the user wants the order delivered. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

While user data, picker data, source data, item data, and order data are described separately, data collected by the data collection module 200 may fall into more than one of these categories. For example, data describing a picker's performance for an order may be order data and picker data.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular source location. For example, the availability model may be trained to predict a likelihood that an item is available at a source location or may predict an estimated number of items that are available at a source location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from a user client device 100 and offers the orders to pickers for service based on picker data. For example, the order management module 220 offers an order to a picker based on the picker's location and the location of the source from which the ordered items are to be collected. The order management module 220 may also offer an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to offer an order to a picker based on a delivery timeframe requested by the user with the order. The order management module 220 computes an estimated amount of time that it would take for a picker to collect the items for an order and deliver the ordered items to the delivery location for the order. The order management module 220 offers the order to a picker at a time such that, if the picker immediately accepts and services the order, the picker is likely to deliver the order at a time within the requested timeframe. Thus, when the order management module 220 receives an order, the order management module 220 may delay offering the order to a picker if the requested timeframe is far enough in the future (i.e., the picker may be offered the order at a later time and is still predicted to meet the requested timeframe).

When the order management module 220 offers an order to a picker, the order management module 220 transmits the order to the picker client device 110 associated with the picker. The order management module 220 may also transmit navigation instructions from the picker's current location to the source location associated with the order. If the order includes items to collect from multiple source locations, the order management module 220 identifies the source locations to the picker and may also specify a sequence in which the picker should visit the source locations.

The order management module 220 may track the location of the picker through the picker client device 110 to determine when the picker arrives at the source location. When the picker arrives at the source location, the order management module 220 transmits the order to the picker client device 110 for display to the picker. As the picker uses the picker client device 110 to collect items at the source location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the source location. The order management module 220 uses sensor data from the picker client device 110 or from sensors in the source location to determine the location of the picker in the source location. The order management module 220 may transmit, to the picker client device 110, instructions to display a map of the source location indicating where in the source location the picker is located. Additionally, the order management module 220 may instruct the picker client device 110 to display the locations of items for the picker to collect, and may further display navigation instructions for how the picker can travel from their current location to the location of the next item to collect for an order.

The order management module 220 determines when the picker has collected the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the source location to the delivery location, or to a subsequent source location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes the total cost for the order and charges the user that cost. The order management module 220 may provide a portion of the total cost to the picker for servicing the order, and another portion of the total cost to the source.

The machine-learning training module 230 trains machine-learning models used by the online system 140. The online system 140 may use machine-learning models to perform functionalities described herein. Example machine-learning models include regression models, support vector machines, naïve Bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, transformers, large-language models, or multi-modal large language models. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model 250 based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from the input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In some embodiments, the machine-learning training module 230 may retrain the machine-learning model based on the actual performance of the model after the online system 140 has deployed the model to provide service to users. For example, if the machine-learning model is used to predict a likelihood of an outcome of an event, the online system 140 may log the prediction and an observation of the actual outcome of the event. Alternatively, if the machine-learning model is used to classify an object, the online system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online system 140 as a whole in its performance of the tasks described herein.

In some embodiments, the machine-learning training module 230 is configured to train a machine learning model 250 to determine a score for a temperature-sensitive item in an order or a batch. The score indicates a likelihood of damage to the temperature-sensitive item due to completing a request for the order. Responsive to the machine learning model 250 outputting a score above a predetermined threshold, the online concierge system 140 adjusts a request for the order.

In some embodiments, when the online concierge system 140 receives one or more orders, the online concierge system 140 generates requests for these orders. Generating a request for an order may include (but is not limited to) batching the order with one or more other orders, setting a sequence of delivery of the batch of orders, or splitting the order into a plurality of sub-orders for separate batching. The online concierge system 140 extracts a set of input features about the request for the order. The set of input features includes at least an estimated transportation time for completing the request for the order. In some embodiments, the online concierge system 140 identifies temperature-sensitive items in the batch. For each time-sensitive item in the batch, a set of input features are extracted. The set of input features includes at least an estimated transportation time for fulfilling an order including the temperature-sensitive item. In some embodiments, the set of input features further include a contextual feature associated with weather or traffic.

The online concierge system 140 then applies a machine-learning model 250 to the set of input features to determine a score for the temperature-sensitive item. The score indicates a likelihood of damage to the temperature-sensitive item due to completing the request for the order. Responsive to the machine-learning model 250 outputting a score above a predetermined threshold, the online concierge system 140 adjusts the request for the order.

In some embodiments, adjusting the request includes re-batching to remove one or more other orders from the batch including the order, changing a sequence of delivery of orders in the batch, adjusting a delivery route of the order to reduce delivery time for the order, splitting up the order into a plurality of sub-orders, such that a sub-order including the temperature-sensitive item has fewer items, or splitting pick and pack process and delivery process, having a first picker perform the pick and pack process for the order, and a second picker perform the delivery process.

Re-batching to remove some orders from the batch that includes a temperature-sensitive order can reduce the overall complexity and handling time of the batch. This results in a quicker pick and pack process and delivery process, and less time for items to be exposed to potential temperature deviations, especially in environments like delivery vehicles or holding areas that might not have optimal temperature control. Similarly, changing the sequence of delivery of orders can prioritize temperature-sensitive orders to be delivered sooner rather than later.

Further, splitting a larger order into several sub-orders, specifically isolating the temperature-sensitive items into a smaller, separate sub-order, can streamline the handling process. Smaller sub-orders can be managed and transported more quickly. Similarly, splitting the pick and pack process and delivery process can also enhance efficiency at each stage. The first picker can assemble the order based on the second picker's delivery schedule, and pick the temperature-sensitive item the last. On the other hand, the second picker can deliver the order including the temperature-sensitive item first.

In some embodiments, the adjusted request is further processed to extract a new set of input features. The machine learning model is again applied to the new set of input features to determine a new score for the temperature-sensitive item. The online concierge system 140 determines whether the new score is above the threshold. If the new score is still above the threshold, the request for the order may be adjusted again. This process may be repeated as many times as necessary until the score of the temperature-sensitive item is below the threshold, and the adjusted request for the order is then sent to a client device associated with a picker.

In some embodiments, if after a maximum number of adjustments are performed, the score is still greater than the threshold, the online concierge system 140 may remove the temperature-sensitive item from the order, or send a notification to the user notifying the user that the likelihood of receiving damaged item due to its temperature-sensitivity.

The data store 240 stores data used by the online system 140. For example, the data store 240 stores user data, item data, order data, and picker data for use by the online system 140. The data store 240 also stores trained machine-learning models 250 trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

Figure 3:
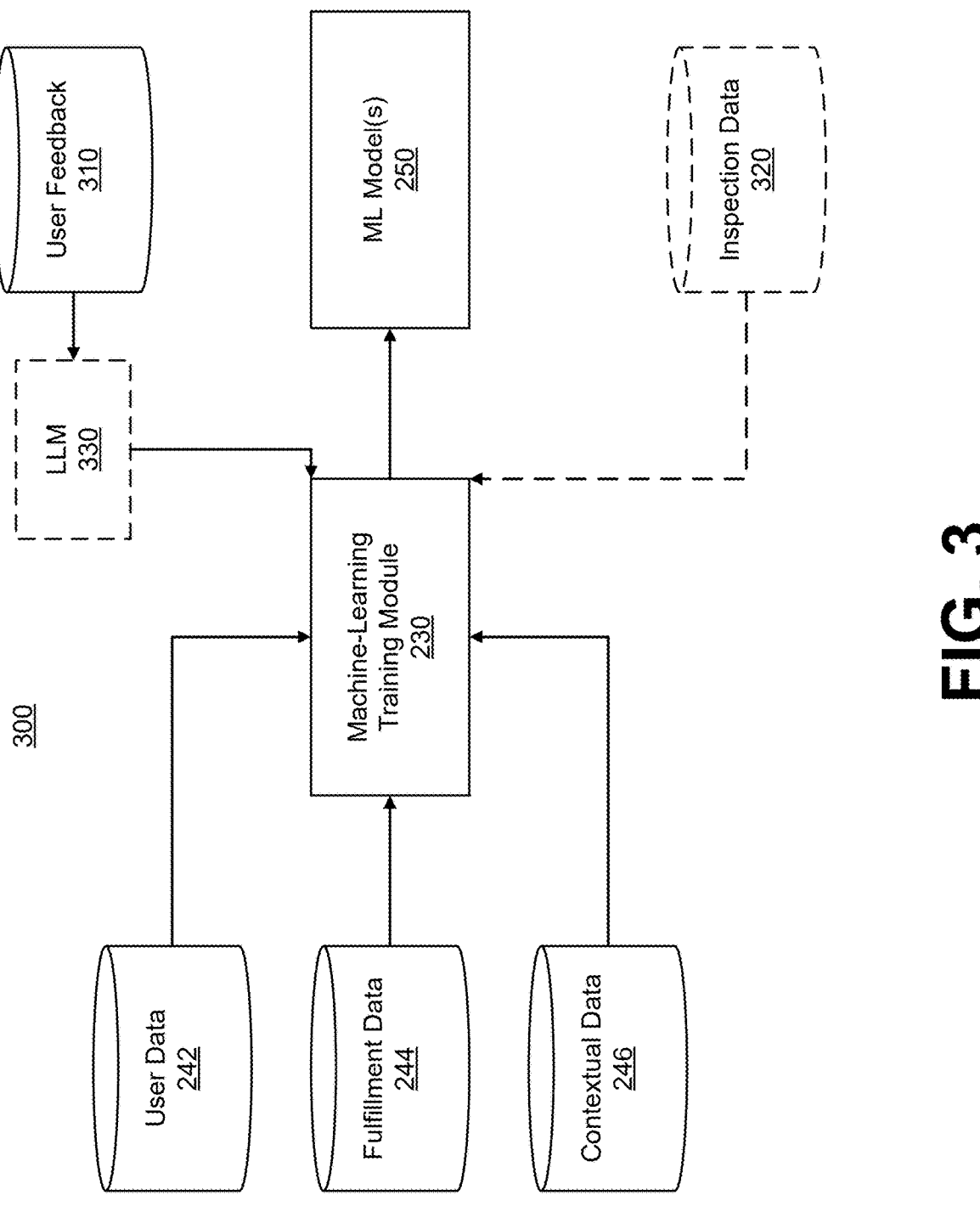
FIG. 3 illustrates an example process of training a machine learning model for determining scores for temperature-sensitive items in accordance with one or more embodiments.

FIG. 3 illustrates an example process 300 of training a machine learning model 250 for determining scores for temperature-sensitive items in accordance with one or more embodiments. The machine-learning training module 230 has access to user data 242, fulfillment data 244, and contextual data 246. The user data may include users' personal information, such as names, contact details (phone number, email address) and sometimes demographic information. The user data 242 may also include users' payment information, such as credit card numbers, billing addresses, and payment preferences to facilitate transactions. The user data 242 may also include preferences and histories, such as past orders, search history, and frequently purchased items to enable personalized recommendations and quicker reordering. The user data 242 may also include delivery information, such as physical addresses, preferred delivery times, and instructions for delivery to ensure correct delivery of orders. The user data 242 may also include user feedback, product reviews and ratings, service feedback, resolution of issues, suggestions for improvement, and usability of website or app.

Fulfillment data 244 may include order details, such as items ordered, quantities, prices, and any specific preferences noted by users (e.g., product substitutions), whether an order includes temperature-sensitive items. The fulfillment data 244 may also include information regarding the scheduling of pickups and deliveries, including time slots, picker availability, route planning, batching, and times spent on picking and packing process and delivery process. The fulfillment data 244 may also include status update, such as real-time updates on status of an order, such as processing, packing, out for delivery, and delivered.

Contextual data 246 may include (but is not limited to) weather data and traffic data that are related to areas including the retail locations and delivery locations.

The machine-learning training module 230 is configured to extract a set of input features from the user data 242, fulfillment data 244, or contextual data 246. The set of input features may include features related to temperature-sensitive items, such as types of items, quantity of each item, historical data on item sensitivity, etc. Different types of items may have different temperature sensitivity. For example, chocolate melts at temperatures above 30° C. (86° F.), while ice cream needs to be stored at temperatures well below freezing, typically around −20° C. (−4° F.). The set of input features may also include features related to delivery logistics, such as a total picking and packing time, a total driving time, a delivery route, or insulation measures used, etc. The set of input features may also include features related to contextual information, such as weather conditions, time of day, day of month, and geo-region of drop-off locations.

In some embodiments, the set of input features may also include features related to user feedback 310, such user ratings and feedback on the handling of temperature-sensitive items (including any specific complaints about spoilage or inadequate insulation), appeasements (including refunds or discounts were given due to issues with temperature-sensitive items), tip reductions, etc. In some embodiments, the user feedback 310 is fed into an LLM 330 with a prompt to determine whether the feedback is related to temperature-sensitive items, and only the user feedback 310 that is determined as related to temperature-sensitive items is extracted as input features. For example, the prompt may include a request, e.g., "Please provide the reason for this refund request and specify if it is related to insulation issues," and a user feedback, e.g., "The pizza was cold by the time it arrived." The online concierge system 140 provides the prompt to the LLM as an input. Responsive to receiving the prompt, the LLM 330 outputs a reason for the feedback. An example output may be "The reason for requesting a refund is related to insulation . . . " The output from the LLM 330 may then be further processed to extract features.

In some embodiments, food safety checks may be routinely performed by a food safety team upon delivery. The inspection data 320 may also be used as an input feature.

The machine-learning training module 230 uses the set of input features to train the machine learning model 250. Once the machine learning model 250 is trained, it can be used to determine scores of temperature-sensitive items in orders. When a new order is received, the online concierge system 140 generates a request for the order. Generating a request for an order may include (but is not limited to) batching the order with one or more other orders, setting a sequence of delivery of the batch of orders, or splitting the order into a plurality of parts for separate deliveries. A batch is a set of multiple orders that are to be fulfilled in a single delivery run. Delivery routes can be planned more efficiently when multiple deliveries are made in a single trip, reducing the total distance traveled and time spent on the road. This not only speeds up the delivery process but also reduces the environmental impact of delivery operations. In addition, batching is particularly effective in dense urban areas where deliveries to multiple addresses close to each other can be consolidated. Batching orders also allows for better route optimization. However, when a batch contains an order with a temperature-sensitive item, the sequence of picking, packaging, and deliveries of orders within the batch could lead to the item sitting in a shopping cart or delivery vehicle for an extended period, potentially causing damage to the temperature-sensitive item.

The online concierge system 140 determines whether the order includes at least one temperature-sensitive item. If the order includes at least one temperature-sensitive item, the online concierge system 140 extracts a set of input features about the request for the order, and applies the machine learning model 250 to the set of input features to determine a score, indicating a likelihood of the temperature-sensitive item being damaged due to completing the request for the order.

If the score is greater than a predetermined threshold, the online concierge system 140 adjusts the request for the order before sending the request to a client device of a picker. The adjusting the request includes re-batching to remove one or more other orders from the batch, changing a sequence of delivery of orders in the batch, adjusting a delivery route of the order to reduce delivery time for the order, splitting up the order into a plurality of sub-orders, such that a sub-order including the temperature-sensitive item has fewer items, or splitting pick and pack process and delivery process, having a first picker perform the pick and pack process for the order, and a second picker perform the delivery process.

In some embodiments, the online concierge system 140 extracts a new set of input features from the new request, and applies the machine learning model 250 to the new set of input features to determine a new score. If the new score is still greater than the threshold, the online concierge system 140 adjusts the request again for the order. This process may repeat as many times as necessary until the score is below the threshold, and the adjusted request is then sent to a client device of a picker for processing.

In some embodiments, after the order is delivered to a user, the user may then provide feedback 310, or the food safety team may provide inspection data 320 about the temperature-sensitive items in the order. These user feedback 310 and inspection data 320 can then be used to retrain the machine-learning model 250. In some embodiments, the user feedback 310 may be analyzed by an LLM 330 to determine whether the feedback is related to the temperature-sensitive item, and only when the feedback is related to the temperature-sensitive item, the feedback is then used for retraining the machine-learning model 250. In some embodiments, reinforcement learning may be performed using the user feedback 310 and inspection data 320. The machine-learning training module 230 may introduce penalties for deliveries that result in negative feedback or inspection results, and provide bonuses for positive feedback or inspection results.

In some embodiments, when the score is higher than a first threshold, but lower than a second threshold (the second threshold being greater than the first threshold), the online concierge system 140 merely generates a notification or recommendation to a picker, reminding the use of insulation measures like insulated bags or containers to safeguard the temperature-sensitive item.

Figure 4:
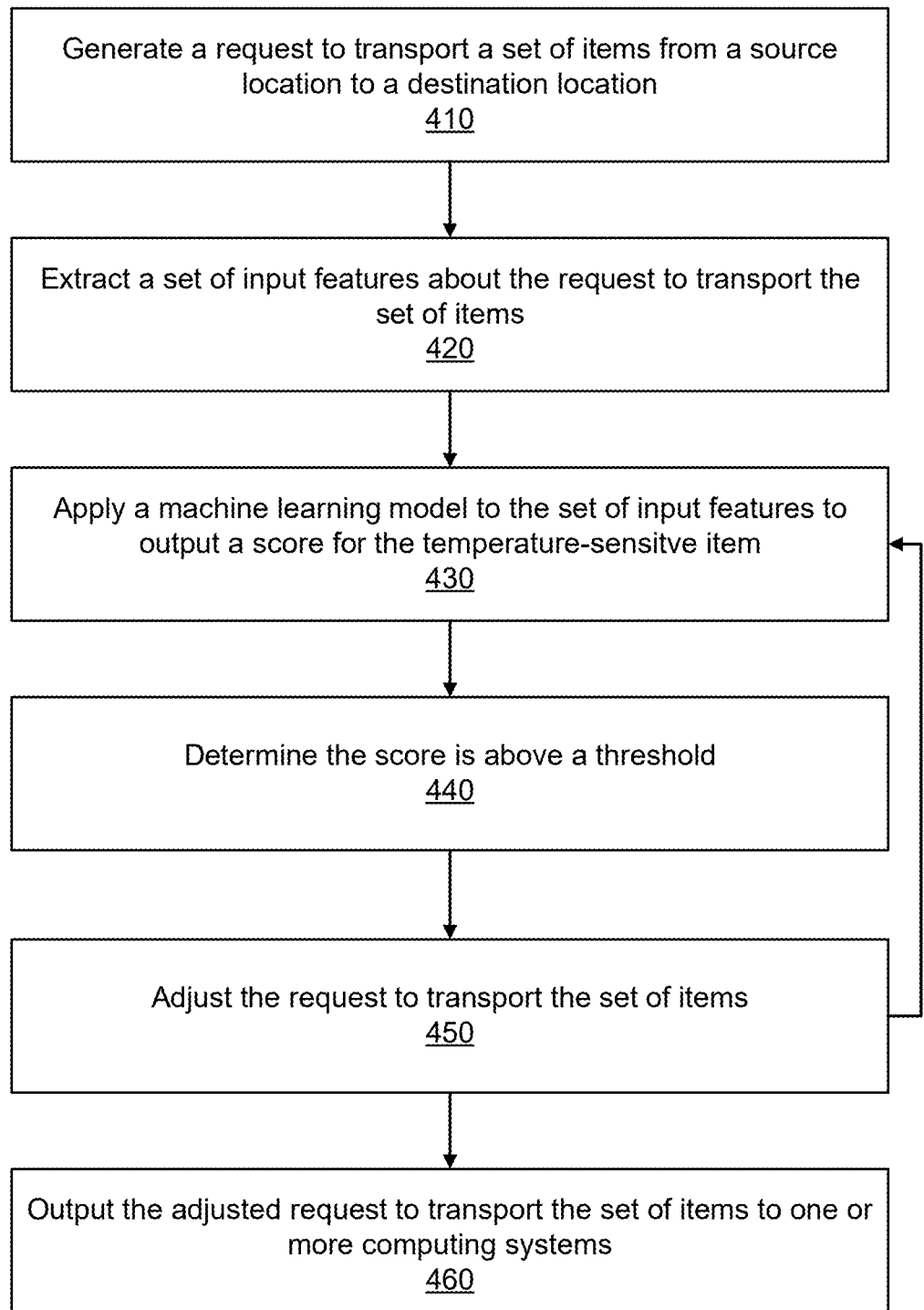
FIG. 4 is a flowchart for a method of using machine learning to determine a score for temperature-sensitive items in an order and mitigate a risk of damaging the temperature-sensitive items during fulfillment, in accordance with some embodiments.

FIG. 4 is a flowchart for a method of using machine learning to determine a score for temperature-sensitive items in an order and mitigate a risk of damaging the temperature-sensitive items during fulfillment, in accordance with some embodiments. Alternative embodiments may include more, fewer, or different steps from those illustrated in FIG. 4, and the steps may be performed in a different order from that illustrated in FIG. 4. These steps may be performed by an online system (e.g., online system 140). Additionally, each of these steps may be performed automatically by the online system without human intervention.

The online system 140 generates 410 generates a request to transport a set of items from a source location to a destination location. The set of items may be in an online order received from a user's client device, such as a mobile phone or a personal computer. For example, the user may use a mobile app or a browser to log into their account, and place an order. An order may or may not include any temperature-sensitive items. In some embodiments, the online system 140 analyzes the data associated with the order to determine whether there is at least one temperature-sensitive item in the order.

In some embodiments, generating the request to transport the set of items includes at least one of selecting a plurality of items to be included in the set of items to be transported from the source location to the destination location, setting a sequence of obtaining one or more of the set of items at the source location, and/or setting a sequence of delivering one or more of the set of items at the destination location.

The online system 140 extracts 420 a set of input features about the request to transport the set of items. The set of input features includes at least an estimated transportation time for completing the request for the order. In some embodiments, the set of input features may also include features related to temperature-sensitive items, such as types of items, quantity of each item, historical data on item sensitivity, etc. Different types of items may have different temperature sensitivity. For example, chocolate melts at temperatures above 30° C. (86° F.), while ice cream needs to be stored at temperatures well below freezing, typically around –20° C. (–4° F.).

In some embodiments, the set of input features about the request to transport the set of items also further includes one or more of: a feature associated with a weather condition of a geographical region of the destination, a feature associated with a type of temperature-sensitive item, and/or a feature associated with an estimated time at the source location to assemble the set of items for transport.

In some embodiments, the set of input features may also include features related to delivery logistics, such as a total picking and packing time, a total driving time, a delivery route, or insulation measures used, etc. The set of input features may also include features related to contextual information, such as weather conditions, time of day, day of month, or geo-region of drop-off locations.

The online system 140 applies 430 a machine learning model to the set of input features to determine a score for the temperature-sensitive item. The score indicates a likelihood that the temperature-sensitive item will transition outside of a target temperature range before completing the transporting of the set of items from the source location to the destination location. The online system 140 determines 440 whether the score is above a threshold.

Responsive to determining that the score is above the threshold, the online system 140 adjusts 450 the request to transport the set of items from the source location to the destination location. In some embodiments, adjusting the request to transport the set of items includes (but is not limited to) removing one or more items from the set of items to be transported from the source location to the destination location, changing a sequence of obtaining one or more of the set of items at the source location, adjusting a route for transporting a set of items from a source location to a destination location, reassigning the set of items across a plurality of new requests to transport the reassigned set of items from the source location to the destination location, wherein the temperature-sensitive item is associated with a new request that has fewer items than the generated request, and/or associating a first task for obtaining the set of items at the source location to a first agent and assigning a second task for transporting the set of items from the source location to the destination location to a second agent.

In some embodiments, the adjusted request is further processed to extract 420 a new set of input features. The machine learning model is again applied 430 to the new set of input features to determine a new score for the temperature-sensitive item. The online concierge system 140 determines 440 whether the new score is above the threshold. If the new score is still above the threshold, the request for the order is adjusted 450 again. The steps 430-450 may be repeated as many times as necessary until the score is below the threshold.

The online system 140 then outputs 460 the adjusted request to transport the set of items to one or more computing systems, causing the one or more computing systems to display the adjusted request to transport the set of items. For example, the one or more computing systems may be client devices associated with the online system 140, or a mobile device associated with an agent who is transporting the set of items.

In some embodiments, the online system 140 further transmits a message to a device associated with an agent who is transporting the set of items from the source location to the destination location. The message includes an instruction to use insulated containers.

In some embodiments, when the score is higher than a first threshold, but lower than a second threshold (the second threshold being greater than the first threshold), the online concierge system 140 merely generates a notification or recommendation to a picker, reminding the use of insulation measures like insulated bags or containers to protect the temperature-sensitive item.

In some embodiments, after the order is delivered to a user, the user may then provide feedback, or the food safety team may provide inspection data about the temperature-sensitive items. User feedback may include (but is not limited to) user ratings and feedback on the handling of temperature-sensitive items (including any specific complaints about spoilage or inadequate insulation), appeasements (including refunds or discounts were given due to issues with temperature-sensitive items), tip reductions, etc. In some embodiments, food safety checks may be routinely performed by a food safety team upon delivery. The inspection result may be stored with the fulfillment data associated with the order.

These user feedback and inspection data can then be used to retrain the machine-learning model. In some embodiments, reinforcement learning may be performed using the user feedback and inspection data. The machine-learning training module may introduce penalties for deliveries that result in negative feedback or inspection results, and provide bonuses for positive feedback or inspection results.

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a non-limiting example, the condition "A, B, or C" is satisfied when A and B are true (or present) and C is false (or not present). Similarly, as another non-limiting example, the condition "A, B, or C" is satisfied when A is true (or present) and B and C are false (or not present).

What is claimed is:

1. A method, performed at a computer system comprising a processor and a computer-readable medium, comprising:

extracting a set of input features about a request to transport a set of items including a temperature-sensitive item from a source location to a destination location, wherein the set of input features includes an estimated transportation time for transporting the set of items from the source location to the destination location, and a feature associated with historical user feedback analyzed by a large language model to determine whether the feedback relates to an insulation issue;

applying a machine learning model to the set of input features to output a score for the temperature-sensitive item, the score indicating a likelihood that the temperature-sensitive item will transition outside of a target temperature range before completing the transporting of the set of items from the source location to the destination location;

responsive to the machine learning model outputting the score equal to or greater than a threshold, adjusting the request to transport the set of items from the source location to the destination location, wherein adjusting the request includes at least one of:

removing one or more items from the set of items to be transported;

splitting the set of items into a plurality of sub-orders such that the temperature-sensitive item is assigned to a sub-order with a reduced number of items;

reordering a sequence of delivery or pickup operations to prioritize delivery of the temperature-sensitive item;

modifying a transport route to reduce an estimated delivery time for the temperature-sensitive item; or assigning a first fulfillment agent to perform a picking task at the source location and a second fulfillment agent to perform a delivery task to the destination location; and sending the adjusted request to transport the set of items to one or more robotic fulfillment agents, causing the one or more robotic fulfillment agents to collect the set of items at the source location or transport the collected set of items from the source location to the destination location.

2. The method of claim 1, wherein generating the request to transport the set of items comprises at least one of:

selecting a plurality of items to be included into the set of items to be transported from the source location to the destination location;

setting a sequence of obtaining one or more of the set of items at the source location; or setting a sequence of delivering one or more of the set of items at the destination location.

3. The method of claim 1, wherein extracting the set of input features about the request to transport the set of items further includes extracting one or more of:

a feature associated with a weather condition of a geographical region of the destination location, a feature associated with a type of the temperature-sensitive item, or a feature associated with an estimated time at the source location to assemble the set of items for transport.

4. The method of claim 1, wherein adjusting the request to transport the set of items further comprises at least one of:

changing a sequence of obtaining one or more of the set of items at the source location;

adjusting a route for transporting a set of items from a source location to a destination location;

reassigning the set of items across a plurality of new requests to transport the reassigned set of items from the source location to the destination location, wherein the temperature-sensitive item is associated with a new request that has fewer items than a previously generated request; or associating a first task for obtaining the set of items at the source location to a first agent and assigning a second task for transporting the set of items from the source location to the destination location to a second agent.

5. The method of claim 1, further comprising:

transmitting a message to a device associated with an agent who is transporting the set of items from the source location to the destination location, the message including an instruction to use insulated containers.

6. The method of claim 1, further comprising:

extracting a new set of input features about the adjusted request to transport the set of items, wherein the set of input features includes an estimated transportation time for transporting the adjusted request;

applying the machine learning model to the new set of input features to output a new score for the temperature-sensitive item, the new score indicating a likelihood that the temperature-sensitive will transition outside of a target temperature range before completing the transporting of the set of items from the source location to the destination location; and responsive to the model outputting the new score below the threshold, outputting the adjusted request to transport the set of items to one or more computing systems.

7. The method of claim 1, further comprising:

training the machine learning model using training data that comprises one or more of: historical user data, historical fulfillment data, or historical contextual data, wherein the historical user data comprises user feedback to orders including one or more of: temperature-sensitive items, the historical fulfillment data comprises times taken on fulfilling orders including temperature-sensitive items, or the historical contextual data comprises weather conditions associated with geo-region of drop off locations of orders including temperature-sensitive items.

8. The method of claim 7, wherein the training data includes previous deliveries of orders that included a temperature-sensitive item, and an indication about whether a user receiving the temperature-sensitive item complained about the temperature-sensitive item being damaged.

9. The method of claim 7, the method further comprising:

receiving user feedback about the temperature-sensitive item transported to a destination location; and retraining the machine learning model using the user feedback.

10. A non-transitory computer-readable medium, encoded thereon computer-readable instructions, when executed by one or more processors, causing the one or more processors to perform steps of:

extracting a set of input features about a request to transport a set of items including a temperature-sensitive item from a source location to a destination location, wherein the set of input features includes an estimated transportation time for transporting the set of items from the source location to the destination location, and a feature associated with historical user feedback analyzed by a large language model to determine whether the feedback relates to an insulation issue;

applying a machine learning model to the set of input features to output a score for the temperature-sensitive item, the score indicating a likelihood that the temperature-sensitive item will transition outside of a target temperature range before completing the transporting of the set of items from the source location to the destination location, wherein the machine learning model is trained by:

accessing a plurality of training examples, each training example comprising features extracted from a historical delivery order that included a temperature-sensitive item, and a label indicating whether the temperature-sensitive item was damaged upon delivery;

applying the machine learning model to the features to generate a predicted likelihood that the temperature-sensitive item would be damaged;

computing a value of a loss function based on a difference between the predicted likelihood and the label; and updating parameters of the machine learning model to reduce the value of the loss function, thereby improving predictive accuracy of the machine learning model;

responsive to the machine learning model outputting the score equal to or greater than a threshold, adjusting the request to transport the set of items from the source location to the destination location, wherein adjusting the request includes at least one of:

removing one or more items from the set of items to be transported;

splitting the set of items into a plurality of sub-orders such that the temperature-sensitive item is assigned to a sub-order with a reduced number of items;

reordering a sequence of delivery or pickup operations to prioritize delivery of the temperature-sensitive item;

modifying a transport route to reduce an estimated delivery time for the temperature-sensitive item; or assigning a first fulfillment agent to perform a picking task at the source location and a second fulfillment agent to perform a delivery task to the destination location; and sending the adjusted request to transport the set of items to one or more robotic fulfillment agents, causing the one or more robotic fulfillment agents to collect the set of items at the source location or transport the collected set of items from the source location to the destination location.

11. The non-transitory computer-readable medium of claim 10, wherein generating the request to transport the set of items comprises at least one of:

selecting a plurality of items to be included into the set of items to be transported from the source location to the destination location;

setting a sequence of obtaining one or more of the set of items at the source location; or setting a sequence of delivering one or more of the set of items at the destination location.

12. The non-transitory computer-readable medium of claim 10, wherein the set of input features about the request to transport the set of items further includes one or more of:

a feature associated with a weather condition of a geographical region of the destination location, a feature associated with a type of the temperature-sensitive item, or a feature associated with an estimated time at the source location to assemble the set of items for transport.

13. The non-transitory computer-readable medium of claim 11, wherein adjusting the request to transport the set of items further comprises at least one of:

changing a sequence of obtaining one or more of the set of items at the source location;

adjusting a route for transporting a set of items from a source location to a destination location;

reassigning the set of items across a plurality of new requests to transport the reassigned set of items from the source location to the destination location, wherein the temperature-sensitive item is associated with a new request that has fewer items than the generated request; or associating a first task for obtaining the set of items at the source location to a first agent and assigning a second task for transporting the set of items from the source location to the destination location to a second agent.

14. The non-transitory computer-readable medium of claim 10, wherein the one or more processors are further caused to transmit a message to a device associated with an agent who is transporting the set of items from the source location to the destination location, the message including an instruction to use insulated containers.

15. The non-transitory computer-readable medium of claim 10, wherein the one or more processors are further caused to perform steps of:

extracting a new set of input features about the adjusted request to transport the set of items, wherein the set of input features includes an estimated transportation time for transporting the adjusted request;

applying the machine learning model to the new set of input features to output a new score for the temperature-sensitive item, the new score indicating a likelihood that the temperature-sensitive will transition outside of a target temperature range before completing the transporting of the set of items from the source location to the destination location; and responsive to the model outputting the new score below the threshold, outputting the adjusted request to transport the set of items to one or more computing systems.

16. The non-transitory computer-readable medium of claim 10, wherein the one or more processors are further caused to train the machine learning model using training data that comprises one or more of: historical user data, historical fulfillment data, or historical contextual data, wherein the historical user data comprises user feedback to orders including one or more of: temperature-sensitive items, the historical fulfillment data comprises times taken on fulfilling orders including temperature-sensitive items, or the historical contextual data comprises weather conditions associated with geo-region of drop off locations of orders including temperature-sensitive items.

17. The non-transitory computer-readable medium of claim 16, wherein the training data includes previous deliveries of orders that included a temperature-sensitive item, and an indication about whether a user receiving the temperature-sensitive item complained about the temperature-sensitive item being damaged.

18. The non-transitory computer-readable medium of claim 16, wherein the one or more processors are further caused to perform steps of:

receiving user feedback about the temperature-sensitive item transported to a destination location; and retraining the machine learning model using the user feedback.

19. A computing system, comprising:

one or more processors; and a non-transitory computer-readable medium, encoded thereon computer-readable instructions, when executed by the one or more processors, causing the one or more processors to perform steps of:

extracting a set of input features about a request to transport a set of items including a temperature-sensitive item from a source location to a destination location, wherein the set of input features includes an estimated transportation time for transporting the set of items from the source location to the destination location, and a feature associated with historical user feedback analyzed by a large language model to determine whether the feedback relates to an insulation issue;

applying a machine learning model to the set of input features to output a score for the temperature-sensitive item, the score indicating a likelihood that the temperature-sensitive item will transition outside of a target temperature range before completing the transporting of the set of items from the source location to the destination location, wherein the machine learning model is trained by:

accessing a plurality of training examples, each training example comprising features extracted from a historical delivery order that included a temperature-sensitive item, and a label indicating whether the temperature-sensitive item was damaged upon delivery;

applying the machine learning model to the features to generate a predicted likelihood that the temperature-sensitive item would be damaged;

computing a value of a loss function based on a difference between the predicted likelihood and the label; and updating parameters of the machine learning model to reduce the value of the loss function, thereby improving predictive accuracy of the machine learning model;

responsive to the machine learning model outputting the score equal to or greater than a threshold, adjusting the request to transport the set of items from the source location to the destination location, wherein adjusting the request includes at least one of:

removing one or more items from the set of items to be transported;

splitting the set of items into a plurality of sub-orders such that the temperature-sensitive item is assigned to a sub-order with a reduced number of items;

reordering a sequence of delivery or pickup operations to prioritize delivery of the temperature-sensitive item;

modifying a transport route to reduce an estimated delivery time for the temperature-sensitive item; or assigning a first fulfillment agent to perform a picking task at the source location and a second fulfillment agent to perform a delivery task to the destination location; and sending the adjusted request to transport the set of items to one or more robotic fulfillment agents, causing the one or more robotic fulfillment agents to collect the set of items at the source location or transport the collected set of items from the source location to the destination location.

20. The computing system of claim 19, wherein generating the request to transport the set of items comprises at least one of:

selecting a plurality of items to be included into the set of items to be transported from the source location to the destination location;

setting a sequence of obtaining one or more of the set of items at the source location; or setting a sequence of delivering one or more of the set of items at the destination location.

\* \* \* \* \*